(12) United States Patent
Kurumisawa

(10) Patent No.: US 6,811,261 B2
(45) Date of Patent: Nov. 2, 2004

(54) PROJECTION DISPLAY APPARATUS

(75) Inventor: Takashi Kurumisawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 124 days.

(21) Appl. No.: 10/015,612

(22) Filed: Dec. 17, 2001

(65) Prior Publication Data

US 2002/0075455 A1 Jun. 20, 2002

(30) Foreign Application Priority Data

Dec. 18, 2000 (JP) ........................................ 2000-383802

(51) Int. Cl.⁷ .............................................. G03B 21/14
(52) U.S. Cl. ................................. 353/20; 346/9; 353/34
(58) Field of Search .............................. 353/20, 31, 33, 353/34, 37; 349/9, 8, 7, 5

(56) References Cited

U.S. PATENT DOCUMENTS 5,863,125 A * 1/1999 Doany .......................... 353/84
6,327,093 B1 * 12/2001 Nakanishi et al. ........... 359/634
6,331,060 B1 * 12/2001 Yamamoto et al. ............ 353/31
6,340,230 B1 * 1/2002 Bryars et al. .................. 353/31
6,394,606 B1   5/2002 Miyawaki et al.
6,450,645 B1 * 9/2002 Jeon ............................. 353/20

FOREIGN PATENT DOCUMENTS

| CN | 1253456 A   | 5/2000  |
|----|-------------|---------|
| JP | 11-295660   | 10/1999 |

* cited by examiner

Primary Examiner—William C. Dowling
(74) Attorney, Agent, or Firm—Oliff & Berridge, PLC

(57) ABSTRACT

The invention provides a projection display apparatus capable of reducing heat absorption in a polarizing plate. In a projection display apparatus according to the present invention, a polarization separator allows first light rays, which are included in the composite light generated by a color-combining unit and polarized in one direction by a polarizing unit, to pass therethrough while reflecting second light rays, which are polarized in another direction by the polarizing unit, so as to separate the first light rays from the second light rays.

22 Claims, 15 Drawing Sheets

[FIG. 1]
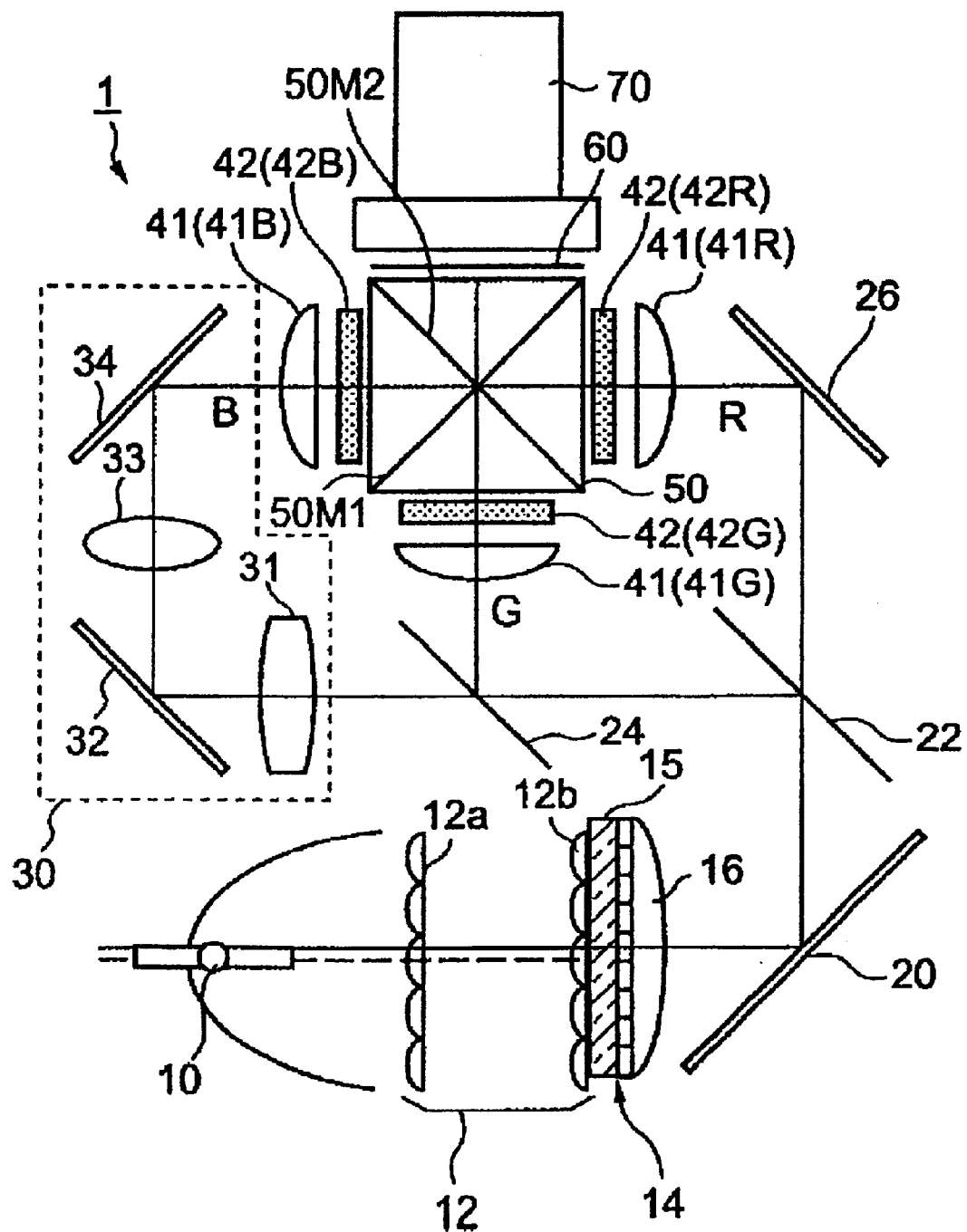

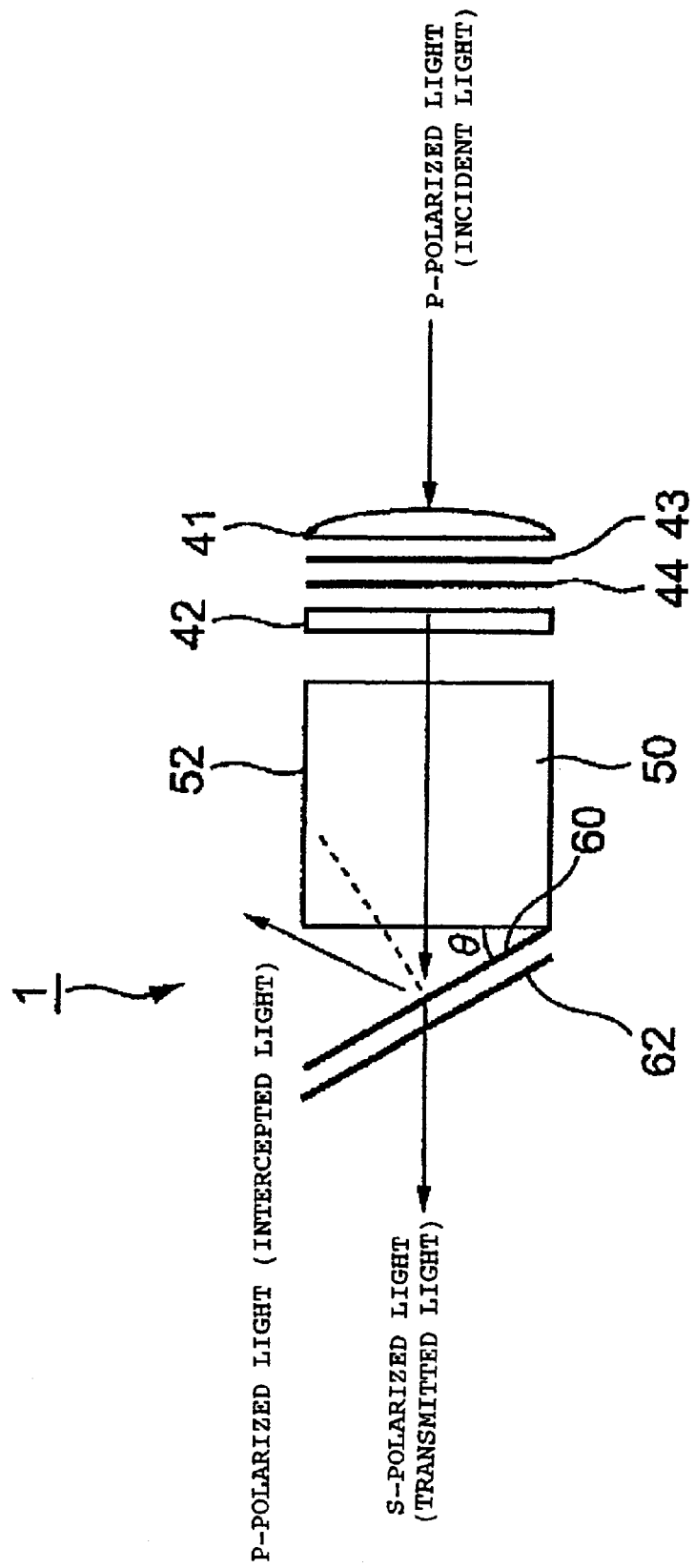
[FIG. 2]

[FIG. 3]
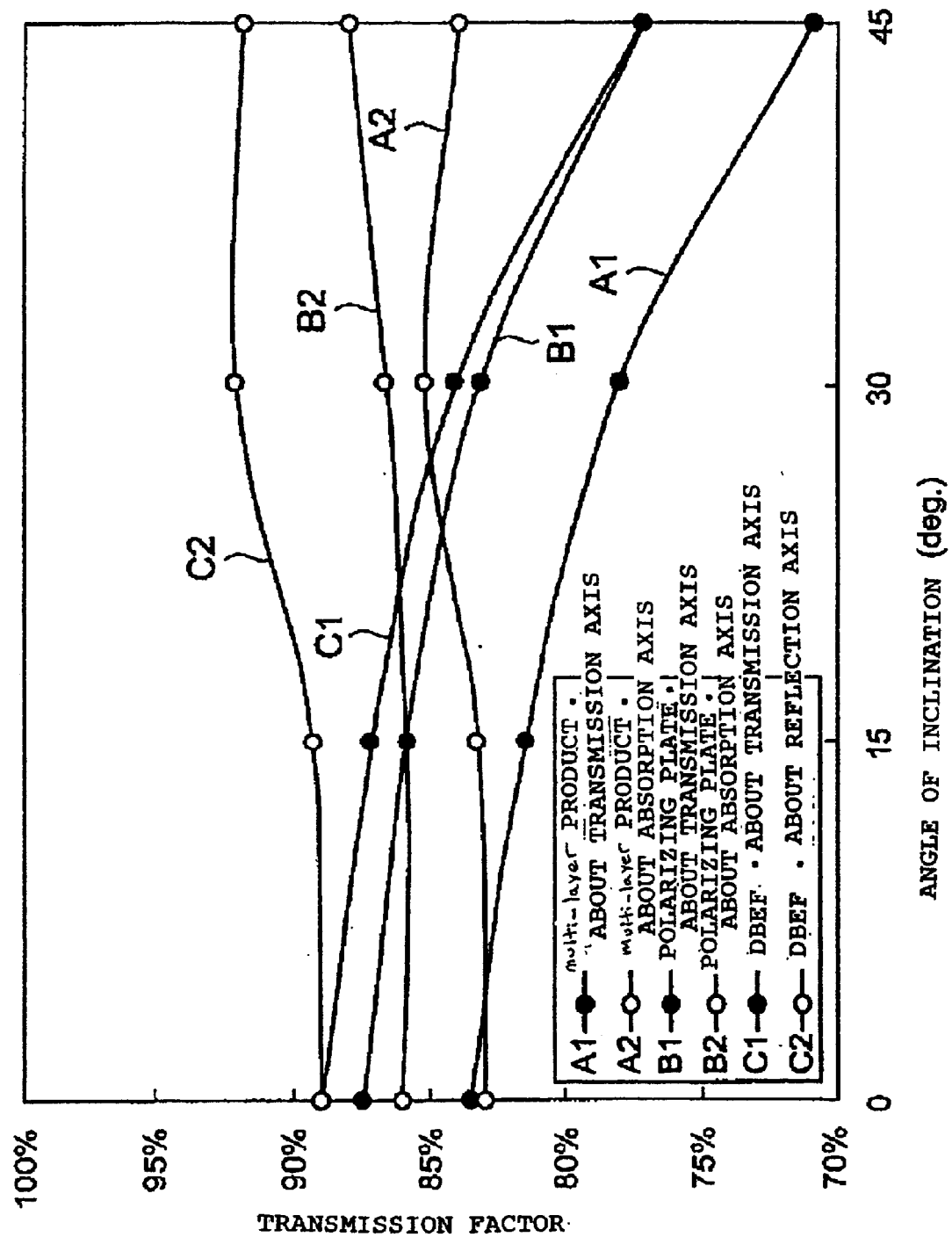

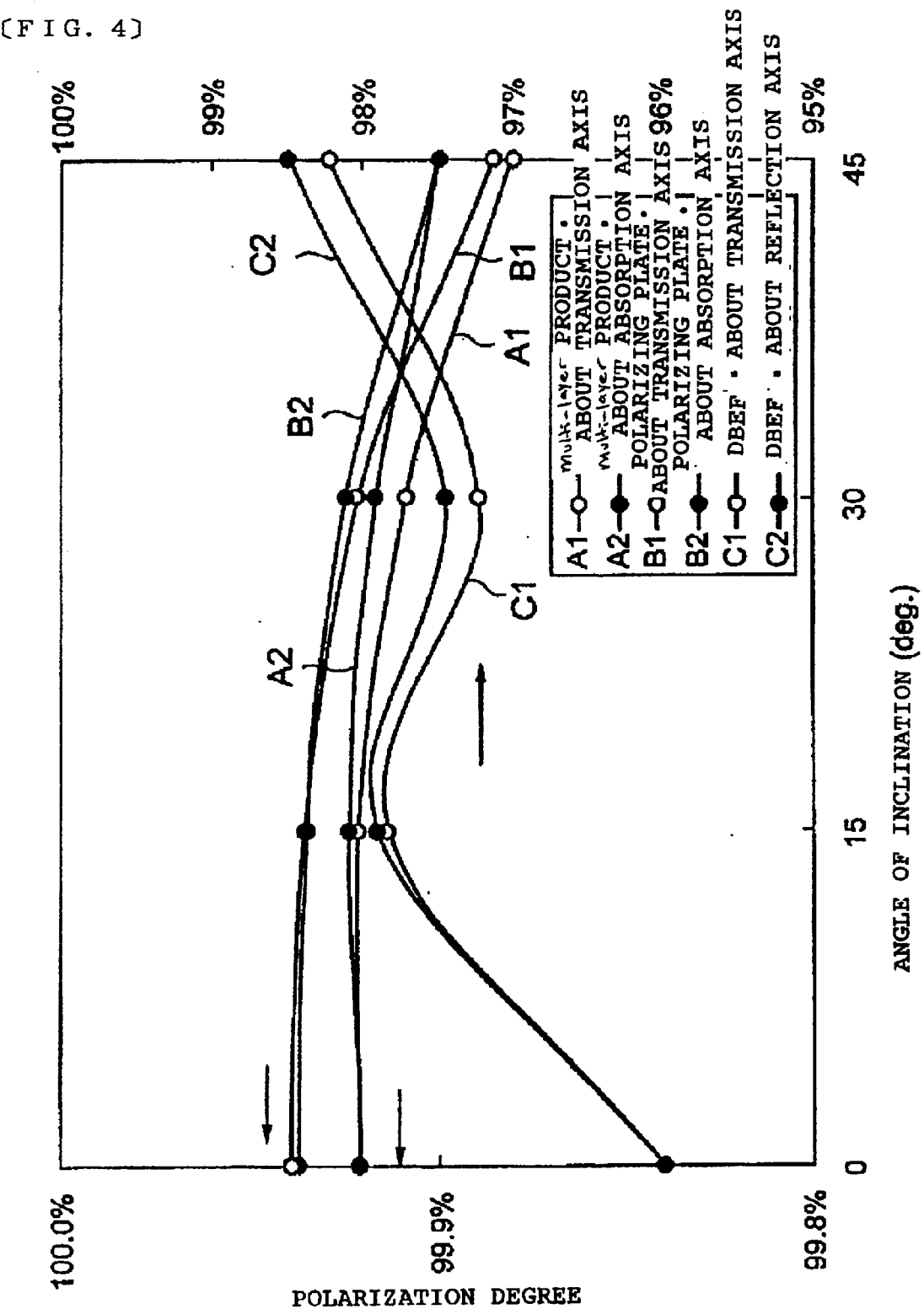
[FIG. 4]

[FIG. 5]
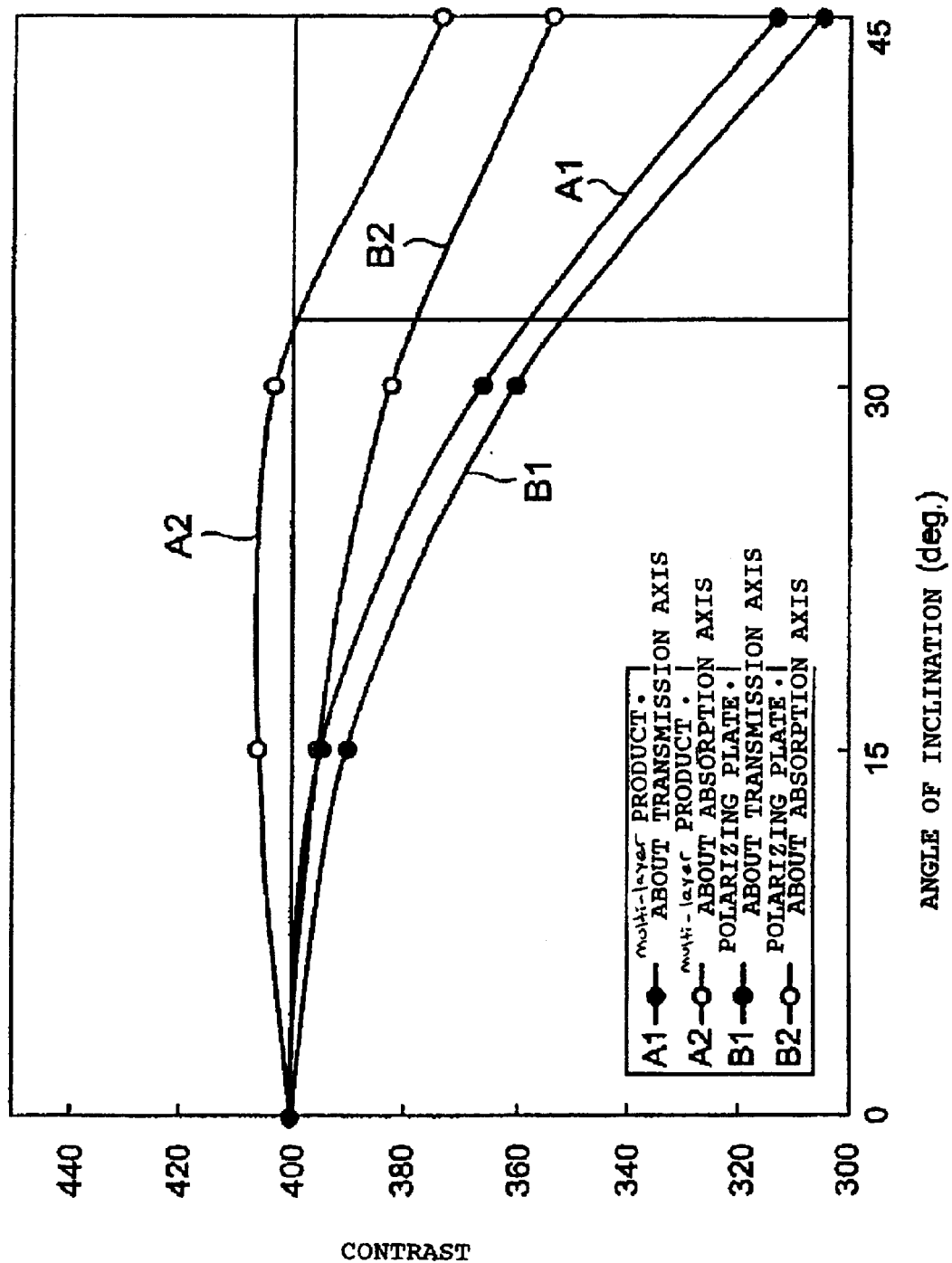

[FIG. 6]
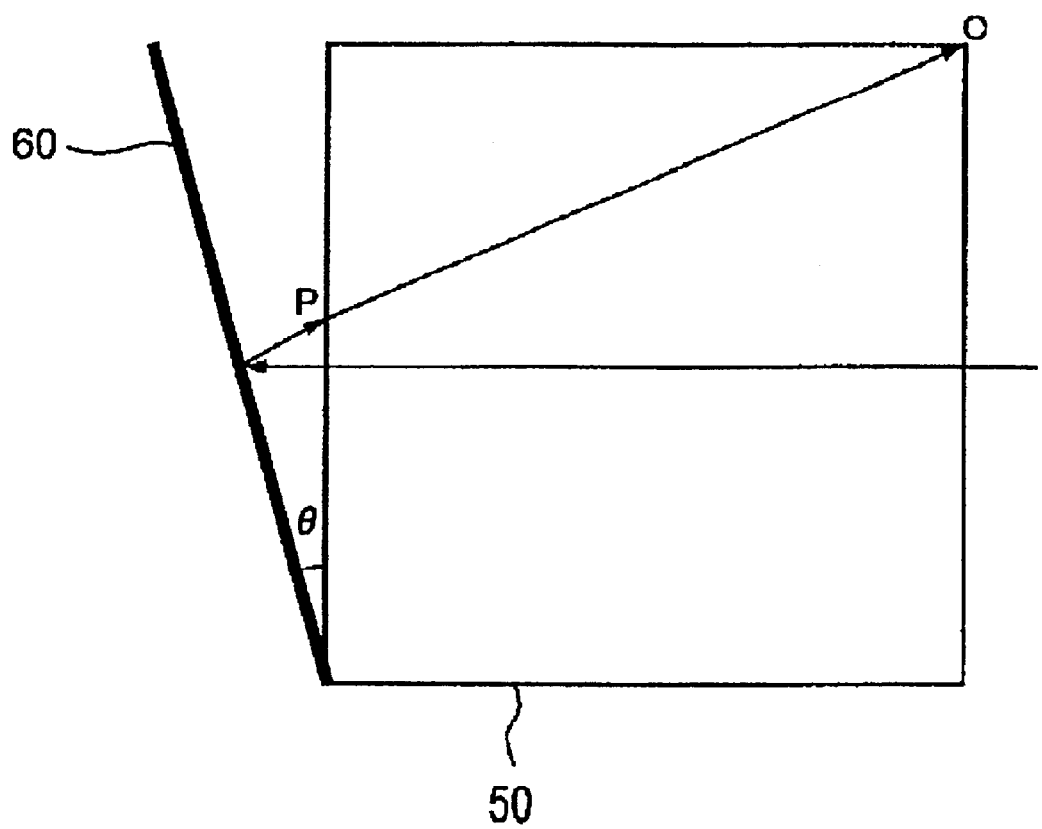

[FIG. 7]
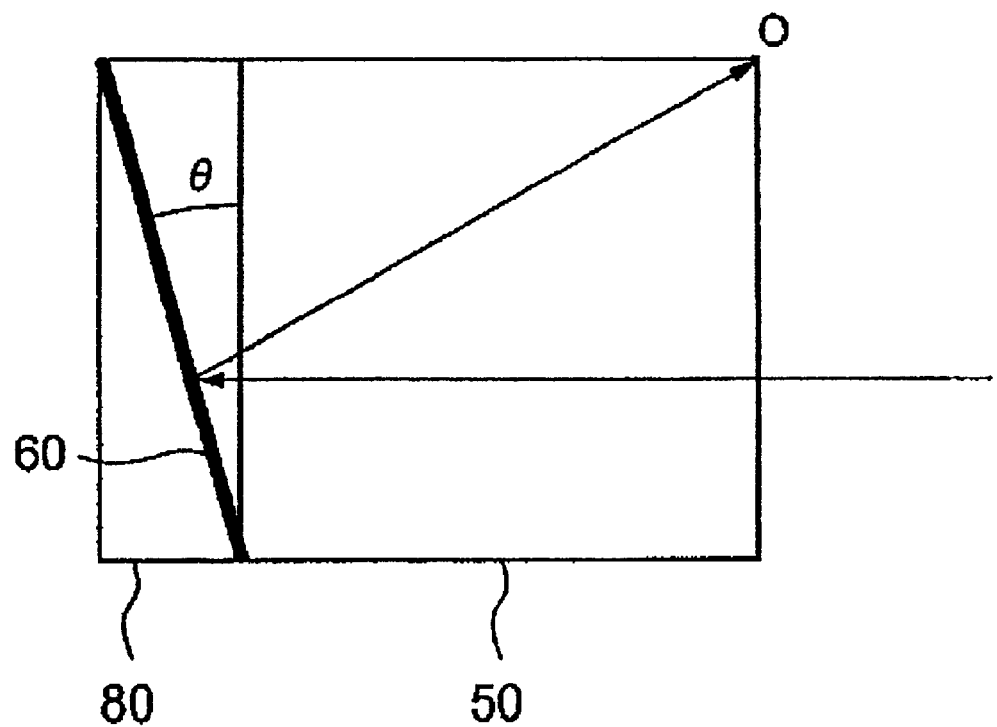

[FIG. 8]
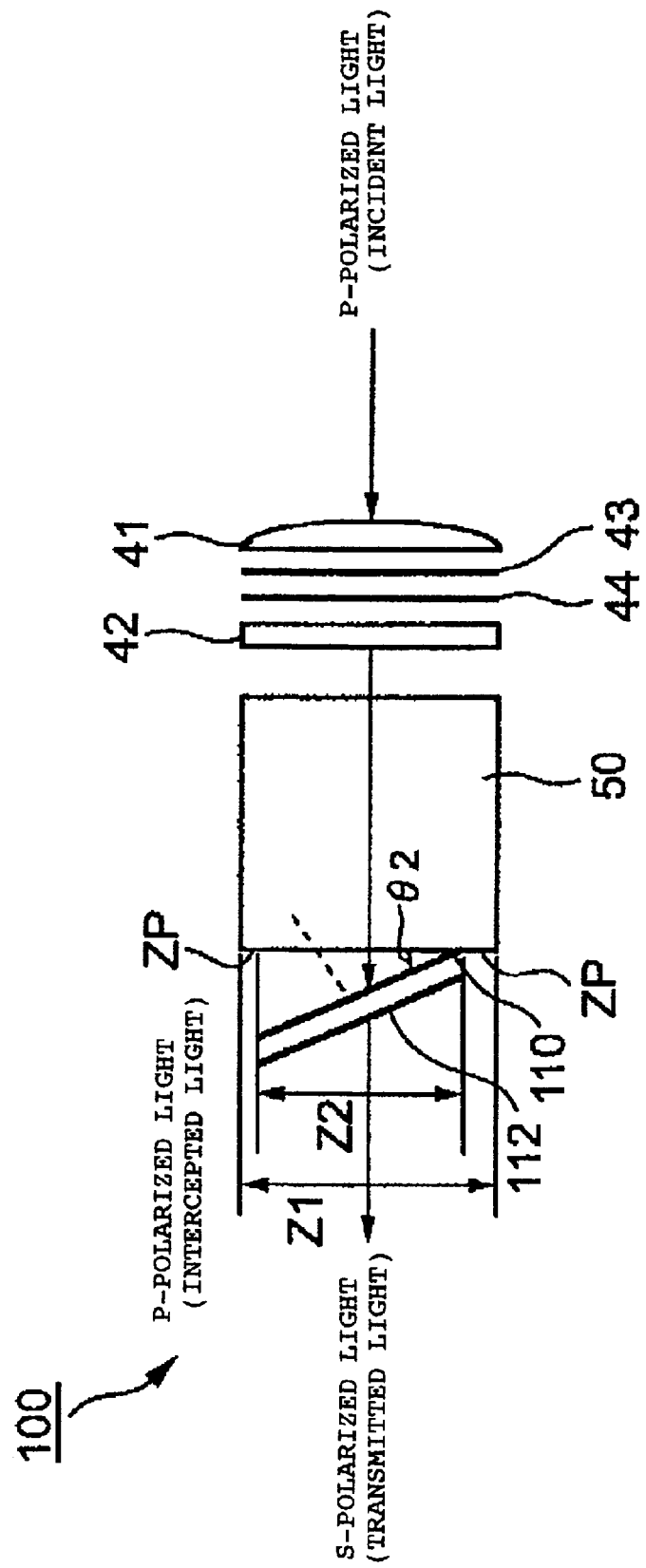

[FIG. 9]
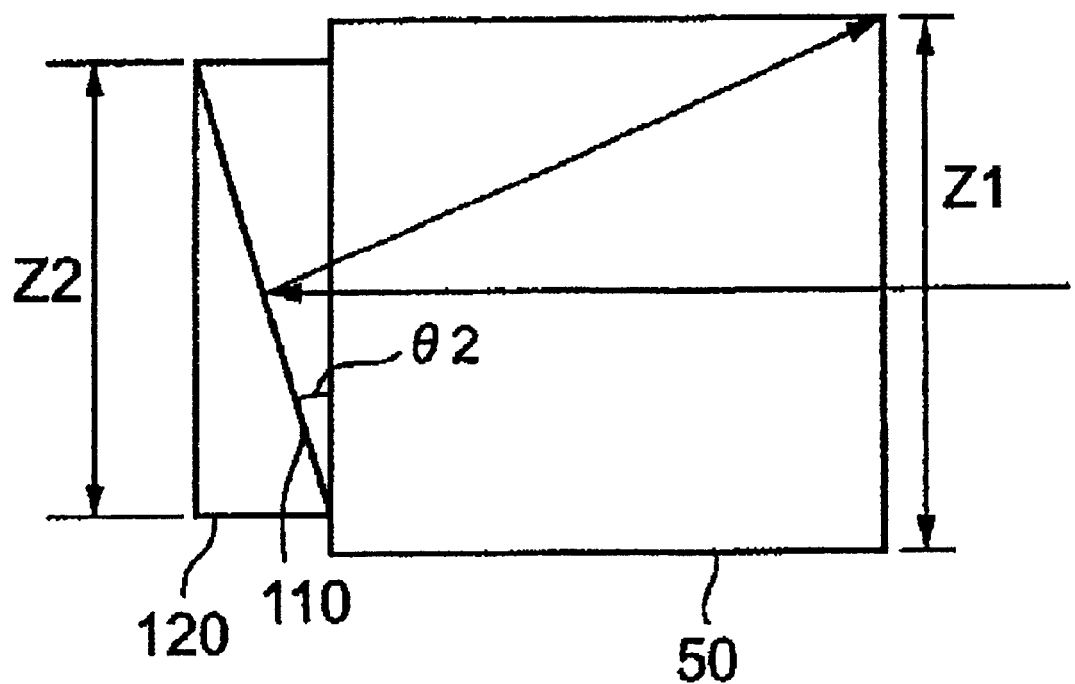

[FIG. 10]
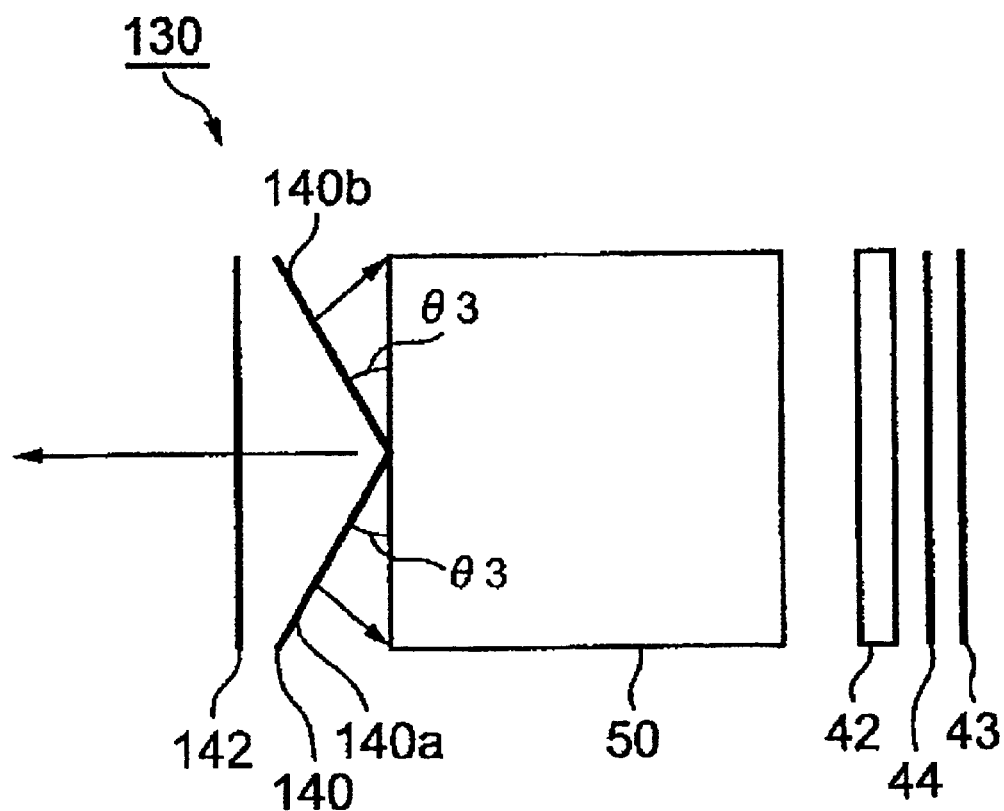

[FIG. 11]
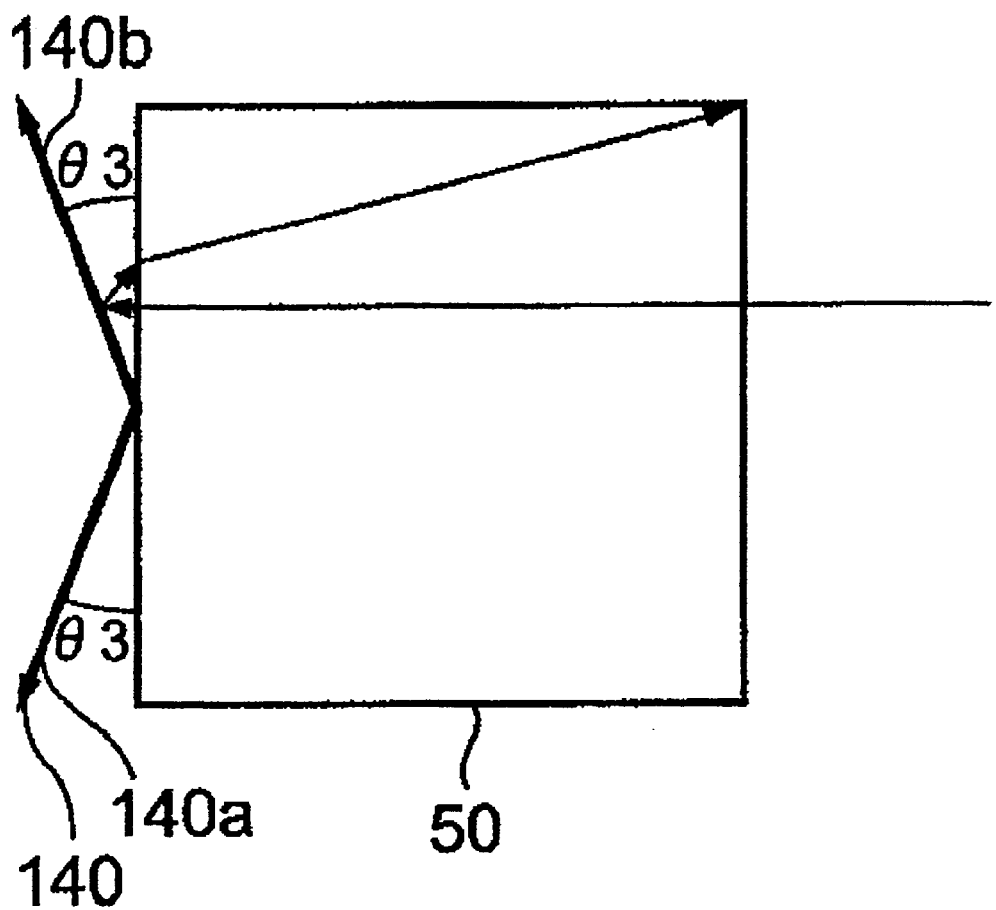

[FIG. 12]
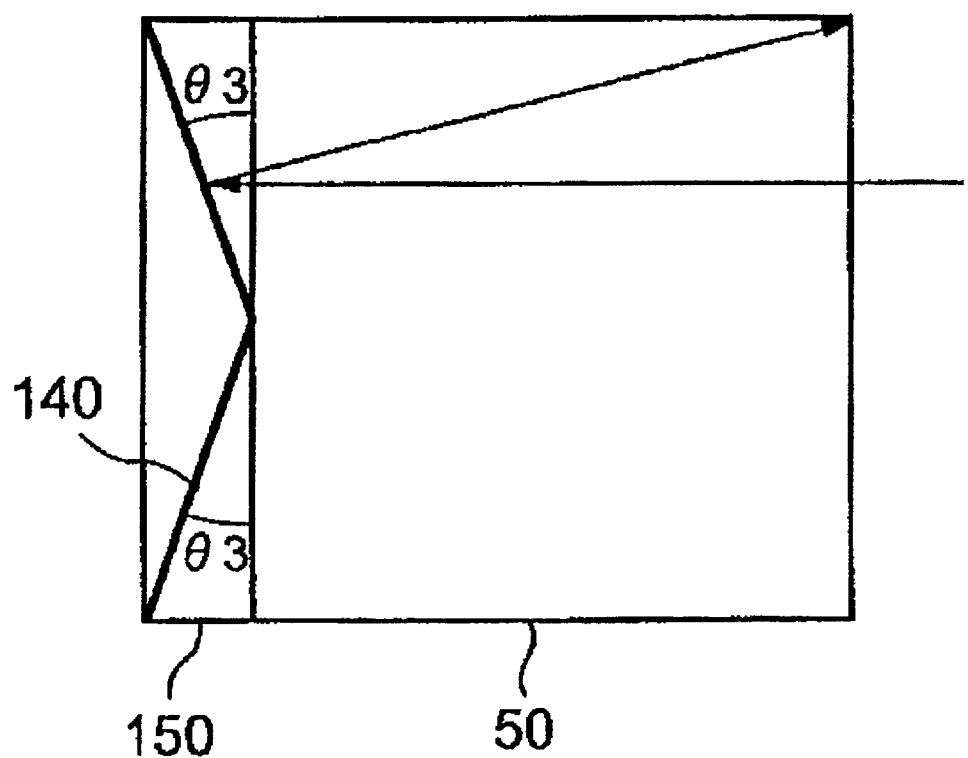

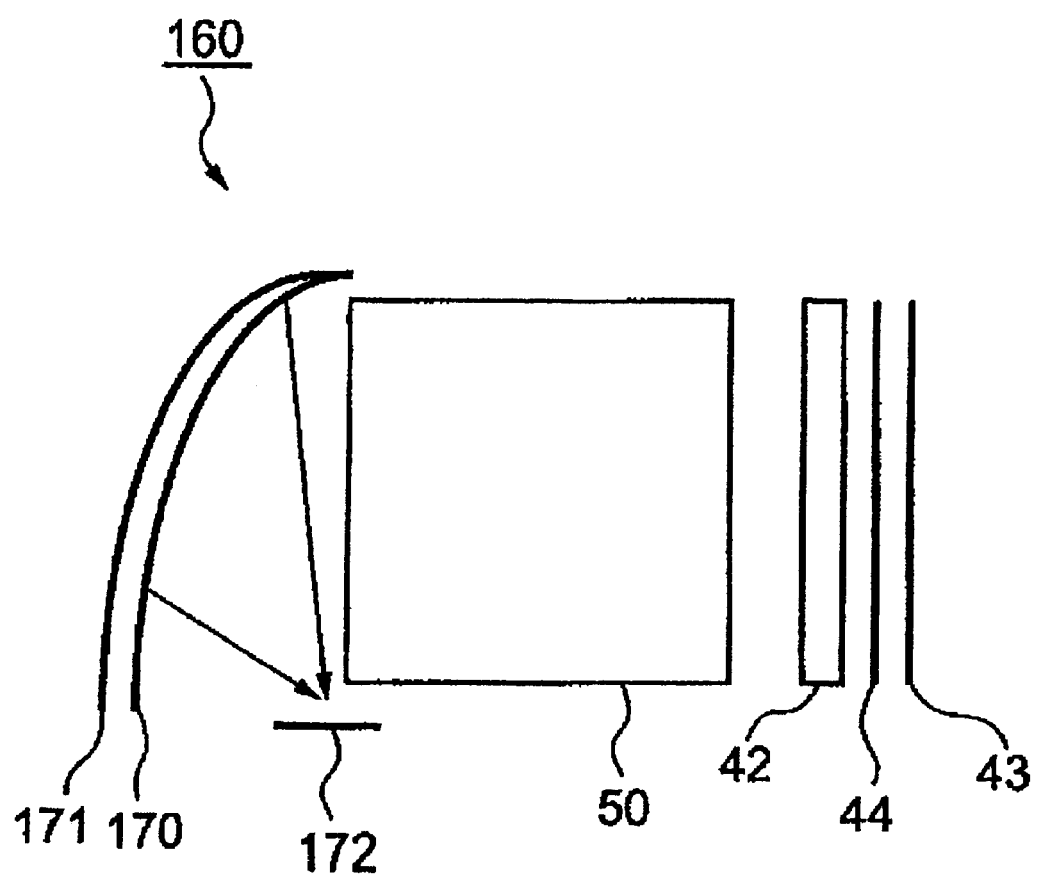
[FIG. 13]

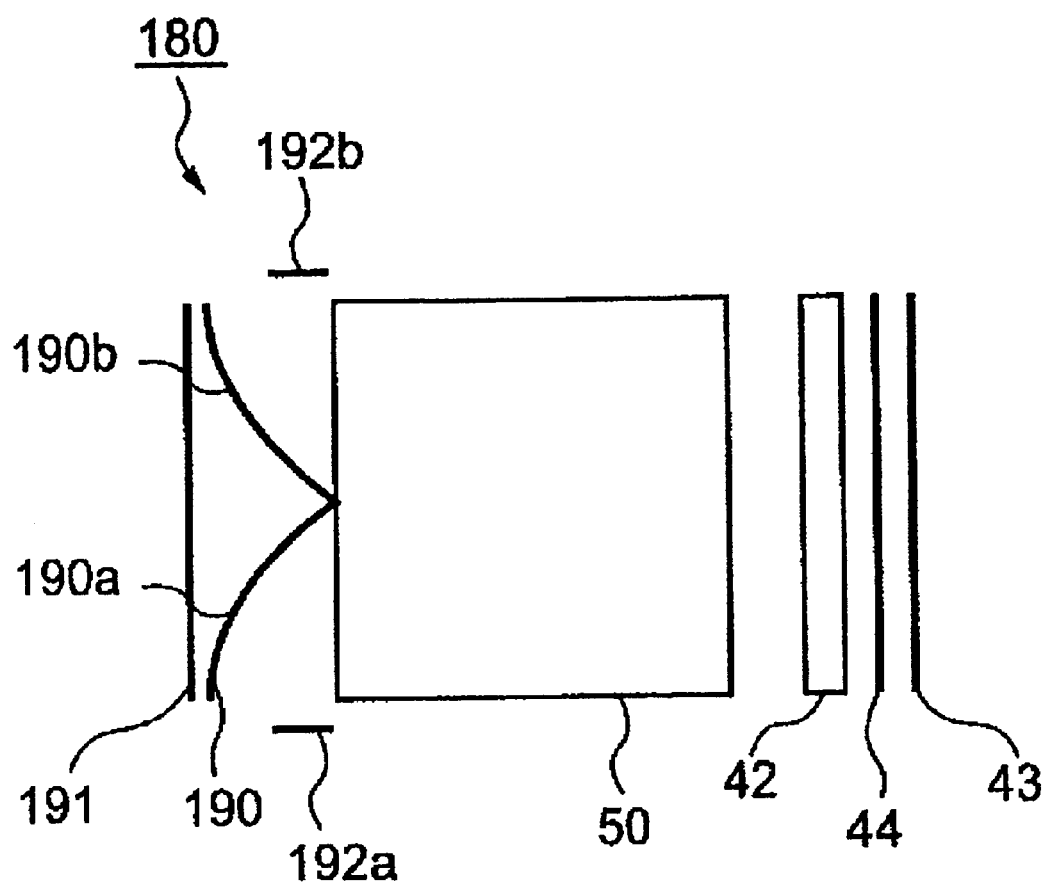
[FIG. 14]

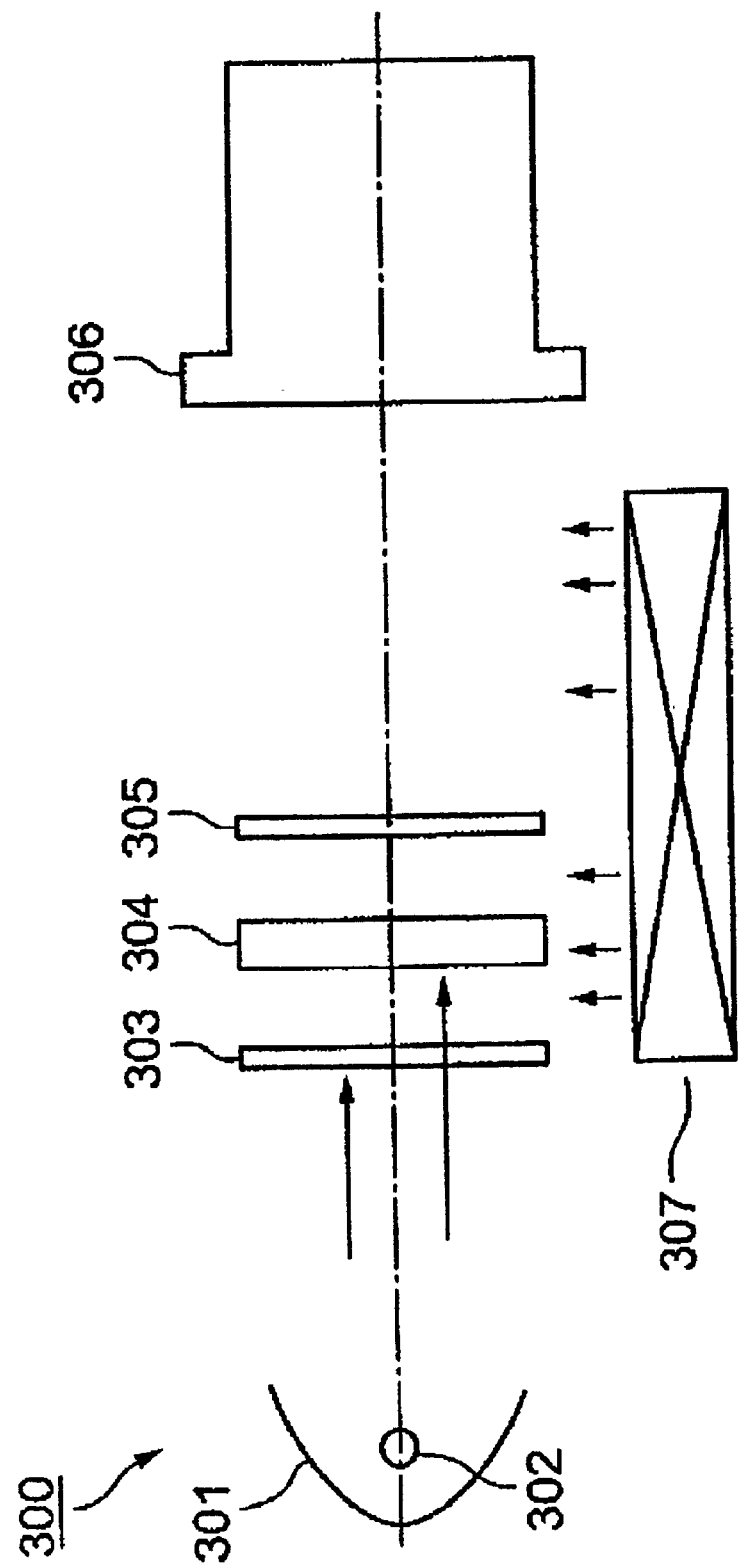
[FIG. 15]

_US 6,811,261 B2_

PROJECTION DISPLAY APPARATUS

BACKGROUND OF THE INVENTION

1. Field of Invention

The present invention relates to a projection display apparatus using a liquid crystal panel, and in particular relates to a liquid crystal projector having a polarization separator formed at the emitting side of the liquid crystal panel.

2. Description of Related Art

An exemplary related art liquid crystal projector is shown in FIG. 15. The liquid crystal projector includes a light source 302 for emitting white light, a reflector 301 for making the white light emitted from the light source 302 substantially parallel, an incident side polarizing plate 303 for allowing an S wave in the reflected light from the reflector 301, for example, to pass therethrough, a transmissive liquid crystal panel 304 for modulating the S wave which has passed through the incident side polarizing plate 303 corresponding to an image signal, an emitting side polarizing plate 305 disposed on the emitting side of the liquid crystal panel 304 for allowing only an arbitrary polarized element (S wave, for example) in the light transmitted from the liquid crystal panel 304 to pass therethrough, a projection lens 306 for magnifying and projecting the light transmitted from the emitting side polarizing plate 305 on a screen, and a cooling fan 307 for cooling the incident side polarizing plate 303, the liquid crystal panel 304, and the emitting side polarizing plate 305.

In a liquid crystal projector 300 having the structure described above, when the S wave is transmitted from the incident side polarizing plate 303, in a black region for example, the S wave is converted into a P wave in the liquid crystal panel 304, while in a white region, the S wave is modulated so as to be transmitted. The converted P wave on one side is blocked off by the emitting side polarizing plate 305 to output a black color, and the S wave on the other side is transmitted to output a white color.

In the related art liquid crystal projector 300 mentioned above, because the emitting side polarizing plate 305 is an absorbing polarizing plate, when a polarized element (P wave, for example) perpendicularly intersecting a polarized element (S wave, for example), which passes through when outputting a black color, is absorbed, heat is generated. In particular, because the amount of light increases with increasing brightness of the liquid crystal projector, the absorbing polarizing plate may burn when outputting a black color over the entire region.

Furthermore, since heating the polarizing plate causes a material included in the polarizing plate, such as iodine, to randomly evaporate, the polarization becomes ununiform, resulting in a reduction of contrast, a generation of color phase irregularity, and a reduction in the polarizing plate life.

SUMMARY OF THE INVENTION

The present invention addresses this situation, and it is an object thereof to provide a projection display apparatus capable of reducing heat absorption of a polarizing plate.

In order to achieve the object mentioned above, according to the present invention, a projection display apparatus includes a light source that projects light onto an object to be projected; a polarizing unit that polarizes the light emitted from the light source at least in a first direction and a second direction that is different from the first direction; a color-separation unit that divides the light polarized by the polarizing unit into a plurality of colors; a plurality of liquid crystal panels that respectively modulate the plurality of colors divided by the color-separation unit; a color-combining unit that combine the plurality of colors respectively modulated by the plurality of liquid crystal panels so as to generate composite light including the plurality of colors; a polarization separator that separates first light rays, which are included in the composite light generated by the color-combining unit and polarized in the first direction by the polarizing unit, from second light rays, which are polarized in the second direction by the polarizing unit, by allowing the first light rays to pass therethrough while reflecting the second light rays therefrom; and a projecting unit that projects the first light rays separated by the polarization separator onto the object to be projected.

Furthermore, preferably, the polarization separator is arranged so that an angle of inclination of the polarization separator, which is the angle between the surface perpendicular to the direction of travel of the composite light generated by the color-combining unit and the polarization-separator surface on which the composite light enters, is an angle that results in a contrast that is larger than a contrast at which the angle of inclination is 0°, which is specified by characteristics defining the relationship between the angle of inclination of the polarization separator and the contrast which is the degree of separation to separate the first light rays from the second light rays.

BRIEF DESCRIPTION OF THE DRAWINGS

FIG. 1 is a schematic of an example of a projection display apparatus according to an embodiment of the present invention;

FIG. 2 is a side view of a part of the projection display apparatus of FIG. 1;

FIG. 3 is a graph showing the transmissivity versus angle of inclination characteristics of a reflection polarizing plate in the projection display apparatus of FIG. 1;

FIG. 4 is a graph showing the polarization degree versus angle of inclination characteristics of the reflection polarizing plate in the projection display apparatus of FIG. 1;

FIG. 5 is a graph showing the contrast versus angle of inclination characteristics of the reflection polarizing plate in the projection display apparatus of FIG. 1;

FIG. 6 is a schematic showing the lower limit of an angle of inclination of the reflection polarizing plate;

FIG. 7 is a schematic showing the lower limit of an angle of inclination of the reflection polarizing plate;

FIG. 8 is a schematic side-view of an example of a projection display apparatus according to another embodiment of the present invention;

FIG. 9 is a schematic showing the lower limit of an angle of inclination of a reflection polarizing plate;

FIG. 10 is a schematic side-view of an example of a projection display apparatus according to another embodiment of the present invention;

FIG. 11 is a schematic showing the lower limit of an angle of inclination of a reflection polarizing plate;

FIG. 12 is a schematic showing the lower limit of an angle of inclination of a reflection polarizing plate;

FIG. 13 is a schematic side-view of an example of a projection display apparatus according to another embodiment of the present invention;

FIG. 14 is a schematic side-view of an example of a projection display apparatus according to another embodiment of the present invention; and FIG. 15 is a schematic of an example of a related art projection display apparatus.

DETAILED DESCRIPTION OF PREFERRED EMBODIMENTS

Preferred embodiments according to the present invention will be specifically described below with reference to the drawings.

[First Embodiment]
(Overall Structure)

First, an overall schematic structure of a liquid crystal projector, which is an example of a projection display apparatus according to the present invention, will be described with reference to FIG. 1. FIG. 1 is a schematic of the liquid crystal projector.

A liquid crystal projector 1 according to the embodiment, as shown in FIG. 1, includes a light-source lamp 10, dichroic mirrors 22 and 24 which are a color-separation unit (color-separation optical system) that divide the light from the light-source lamp 10 into multiple different colors (R, G, and B), an integrator 12 disposed between the light-source lamp 10 and the dichroic mirror 22 that distributes illumination uniformly or equally, a polarization-conversion system 14 which is a polarization-conversion unit that converts undefined polarized light into one kind of polarized light, a mirror 20 which is an optical system that reduces and reflects the light beam from the polarization-conversion system 14, liquid crystal panels 42 (42R, 42G, and 42B) that modulate the intensity of each spectral (R, G, and B) divided by the dichroic mirrors 22 and 24, a reflection mirror 26 disposed between the dichroic mirror 22 and the liquid crystal panel 42R, condenser lenses 41 (41R, 41G, and 41B) respectively disposed in incident sides of the liquid crystal panels 42 (42R, 42G, and 42B), a cross-dichroic prism 50 (referred to as a "prism" below) which is a color combining unit that combines each spectral (R, G, and B) modulated in intensity by the liquid crystal panels 42 (42R, 42G, and 42B), a projection lens 70 which is a projection unit that magnifies and projects the combined light combined by the prism 50, a relay optical system 30 disposed between the dichroic mirror 24 and the liquid crystal panel 42B that compensates one optical-path length different from those of the other two colors, and a reflection polarizing plate 60 included in a polarization separating unit disposed between the projection lens 70 and the prism 50 that separates two orthogonal polarized light waves, S-wave and P-wave, by allowing one of the two orthogonal polarized light waves (S-wave, for example) in the light straight waves passing through the liquid crystal panels 42 (42R, 42G, and 42B) so as to pass therethrough while allowing the other (P-wave, for example) to reflect therefrom.

The integrator 12 brightens peripheral portions by dispersing the light traveling from the center of the light-source lamp 10, and is formed of two lens arrays 12a and 12b. A rectangular lens forming the first lens array 12a divides and condenses the light beam from the light source lamp 10 to form a secondary light-source image by leading the light beam into a relay lens corresponding to the second lens array 12b. The relay lens forming the second lens array 12b performs image-formation of the rectangular lens corresponding to the first lens array 12a onto the liquid crystal panels 42 (42R, 42G, and 42B).

The polarization-conversion system 14 is a system that outputs only one polarized light from the light including both the P-wave and S-wave corresponding to the polarization of the P-wave or S-wave. A phase plate, called a ¼λ plate, can be disposed behind the PBS array 15, where λ represents the polarized light wavelength. This phase plate can convert the P-wave to an S-wave having twice the intensity of the P-wave. For instance, when reflecting one polarized P-wave, the P-wave is changed by the phase plate into the S-wave so as to only output the S-wave, for example.

The polarization-conversion system 14 includes a condenser lens 16 and a disk-shaped polarization beam splitter (PBS) array 15 disposed between the second lens array 12b and the condenser lens 16.

The PBS array 15 is an arrangement in which a polarization separation surface and a reflection surface are arranged in a staggered configuration and in parallel, and the number of pairs formed of one polarization separation surface and one reflection surface corresponds to the number of columns or rows of the first lens array 12a.

The secondary light-source image is formed in the PBS array 15 by polarization. The P wave portion and the S wave portion of the secondary light-source image are spatially separated to form a pair state. The secondary light-source image, for the P wave portion, is due to the P-polarized wave, or the polarized P wave. The secondary light-source image, for the S wave portion, is due to the S-polarized wave, or the polarized S wave. The light of this single polarizing component is polarized and modulated by an LCD panel for each color, and light including different polarization components is output from the LCD panel by an applied voltage. By transmitting this light through a polarization separator, change in brightness occurs as to whether the output is black or white. That is, the signal added to the LCD panel corresponds to the change in brightness.

The condenser lens 16 superimposes plural images of the rectangular lens onto the liquid crystal panels 42 by orientating a main light-beam passing through the relay lens toward the central direction of the liquid crystal panels 42 (42R, 42G, and 42B).

The relay optical system 30 includes two reflection mirrors 32 and 34 and a lens 33 disposed between the reflection mirrors 32 and 34.

The prism 50 is formed by bonding four rectangular prisms together in an X-shape to be a substantially rectangular solid. As shown in FIG. 1, three surfaces of the prism 50 are used for incident surfaces of the liquid crystal panels 42R, 42G, and 42B, respectively, and another one surface is used as a combined light emitting surface that emits the combined light. One of the residual two faces is used as an emitting surface that dissipates the polarized light, e.g., the P-wave, which is reflected by a reflection polarizing plate 60, which will be described below, outside of the prism 50.

The reflection polarizing plate 60 is arranged so that the incident surface, on which the combined light emitted from the prism 50 enters, is inclined at a predetermined angle relative to the optical axis of the combined light. In the embodiment, the angle of inclination ranges approximately from 15° to 33° as will be described below, so that the reflection polarizing plate 60 can be arranged within a narrow space between the projection lens 70 and the prism 50. In addition, in the embodiment, one polarizing plate 60 is commonly used to reflect emitting rays from three liquid crystal panels 42.

In the liquid crystal projector 1 having the optical system structure described above, the white light emitted from the light-source lamp 10 is reduced and reflected by the mirror 20, and is divided by the two dichroic mirrors 22 and 24 into the three primary colors red (R), green (G), and blue (B), so as to illuminate the corresponding liquid crystal panels 42R, 42G, and 42B.

In the three primary-color rays (R-ray, G-ray, and B-ray) respectively modulated in intensities by the liquid crystal panels 42 (42R, 42G, and 42B), the G-ray passes straight through the prism 50; the B-ray is reflected by a connection surface 50M2 within the prism 50; and the R-ray is reflected by the connection surface 50M2 so as to be combined by the prism 50 and magnified and projected by the projection lens 70 onto a screen (surface to be projected).

(Arrangement of Polarizing Plate)

The arrangement of the reflection polarizing plate in accordance with the present invention will be now described with reference to FIG. 2. FIG. 2 is a schematic schematically showing an optical system for at least one color derived from the three-disk liquid crystal projector shown in FIG. 1.

Referring to FIG. 2, the liquid crystal projector 1 includes an incident-side reflection polarizing plate 43 and an absorption polarizing plate 44, both of which are disposed between the condenser lens 41 and the liquid crystal panel 42, and the emitting side reflection polarizing plate 60 and an absorption polarizing plate 62, both of which disposed in an inclined state at a predetermined angle relative to an optical axis in the emitting side of the composite light from the prism 50. In addition, the incident-side reflection polarizing plate 43 has the same transmission axis as that of the incident-side absorption polarizing plate 44, while the emitting side reflection polarizing plate 60 has the same transmission axis as that of the emitting side absorption polarizing plate 62.

In the embodiment, the reflection polarizing plate 60 and the absorption polarizing plate 62 are lined-up (laid on) with each other so as to be one polarizing plate of a lined-up (multi-layer) structure (which may be referred to as a "multilayer product"), which is inclined at a predetermined angle of inclination. However, the invention is intended to cover other structures. For example, only the reflection polarizing plate 60 may be inclined, while the absorption polarizing plate 62 may not be inclined and erected vertically (perpendicularly to the optical axis), because the polarization degree is increased when erecting the absorption polarizing plate 62 vertically.

Furthermore, in the embodiment, the inclination spreads toward upside as shown in FIG. 2. However, the inclination direction is not limited to this arrangement, and it may spread toward the downside direction.

The reflection polarizing plates 43 and 60 are made of a polarizing film, such as DBEF (the trade name of 3M Co.) and PCF (the trade name of Nitto Denko Co.) made by depositing dielectric multi-layered films. In the incident light entering the reflection polarizing plates 43 and 60, when the waves, in which polarizing surfaces perpendicularly intersect each other, are respectively referred to as a P-wave and a S-wave, the P-wave having one polarizing surface (a polarized light ray vibrating in the horizontal direction, for example) is perfectly reflected by the reflection polarizing plates 43 and 60, while the S-wave (a polarized light ray vibrating in the vertical direction) passes through the reflection polarizing plates 43 and 60.

In addition, in the embodiment, the angle of inclination of the reflection polarizing plate 60 is less than 45° as will be described below, so that the reflected light returns within the prism 50 so as to pass therethrough.

In order to prevent the light from refracting and reflecting within or on the surface of the prism 50 and thereby returning to the prism 50, as shown in FIG. 2, as for the surfaces of the prism 50 other than the emitting surface of the composite light from the prism 50, an AR (antireflection) coat 52, which is a transmissive member (coating member), that passes another polarized P-wave reflected by the reflection polarizing plate 60 straight through, is deposited on the transmission surface of the other straight polarized light. After polishing the surface of the prism 50, the AR coat 52 is formed by depositing it thereon. Thereby, the reflection on the surface of the prism 50 is eliminated.

The AR (anti-reflection) coat 52 is made of a material, such as a dielectric multi-layered film. In order to prevent the incident light from the liquid crystal panels 42 from returning, the AR coat 52 is deposited on prism faces opposing the liquid crystal panels 42 and one of top and bottom faces thereof, i.e., at least four faces in total. In addition, the coat may not be deposited on the other face through which the light does not pass.

The light reflected by the reflection polarizing plate 60 enters the prism 50 from a composite-light-emitting surface thereof so as to pass through the surface of the AR coat 52 on the prism 50.

(Polarization Degree Versus Angle of Inclination Characteristics)

The inventors measured the polarization degree, transmissivity, and contrast of the polarizing plate (multi-layer product) made by laying the reflection polarizing plate 60 on the absorption polarizing plate 62 together when the angle of inclination of the plate is changed. The contrast represents the light-separating degree of the polarizing plate.

The transmissivity denotes a light-transmissible rate, and the polarizing degree denotes a rate of the P-wave separable from the S-wave.

The inventors examined and compared a case of inclination about a transmission axis with a case of inclination about an absorption axis (reflection axis) perpendicular to the transmission axis. As a result, as shown in FIG. 3, for example, in the transmissivity versus angle of inclination characteristics, in cases: when an absorption polarizing plate is inclined about a transmission axis; a DBEF, which is a reflection polarizing plate, is inclined about a transmission axis; and a multi-layer product is inclined about a transmission axis, the transmissivity decreases with increasing inclination in the angle, as indicated by symbols B1, C1, and A1. (In the below description of FIGS. 3 to 5, a polarizing plate indicates an absorption polarizing plate and a DBEF indicates a reflection polarizing plate.) On the other hand, in cases: when a polarizing plate is inclined about an absorption axis; a DBEF is inclined about a reflection axis; and a multi-layer product is inclined about an absorption axis, the transmissivity increases with increasing inclination in the angle, as indicated by symbols B2, C2, and A2.

Regardless of the angle of inclination, the overall transmissivity of the DBEF, the polarizing plate, and the multi-layer product decreases in that order.

From the above, transmissivity of the DBEF, the polarizing plate, and the multi-layer product decrease with increasing inclination of the angle about the transmission axis while the transmissivity increases when inclining about the absorption axis (reflection axis), although there are errors due to measuring instruments.

(Polarization Degree Versus Angle of Inclination Characteristics)

Next, when verifying the polarization degree versus angle of inclination characteristics about these six types of structures, the results shown in FIG. 4 are obtained. That is, in A1 of the multi-layer product about the transmission axis, A2 of the multi-layer product about the absorption axis, B1 of the polarizing plate about the transmission axis, and B2 of the polarizing plate about the absorption axis, the polarization degree is substantially constant at 99.9% or more until approximately 30%, and the polarization degree decreases slightly when exceeding approximately 30°.

On the other hand, in the DBEF both about the transmission axis and the absorbing axis (reflection axis), the polarization degree increases until approximately 15°, the polarization degree decreases slightly until between substantially 15° and 30°, and the polarization degree decreases slightly when exceeding approximately 30°.

(Contrast Versus Angle of Inclination Characteristics)

Furthermore, when verifying the contrast versus angle of inclination characteristics about four types derived from the six types mentioned above except DBEFs, the results shown in FIG. 5 are obtained. That is, in B1 of the polarizing plate about the transmission axis, B2 of the polarizing plate about the absorption axis, and A1 of the multi-layer product about the transmission axis, the contrast decreases gradually from 400 with increasing inclination in the respective angles. Only in A2 of the multi-layer product about the absorption axis, the contrast is slightly larger than 400 until approximately 30°, and is gently decreasing when exceeding 30°.

In addition, because a reflection polarizing plate, such as a DBEF and PCF, is reduced in contrast performance, when the DBEF is used by itself, the contrast is significantly low; and when a reflection polarizing plate is singly used, the contrast is also reduced below 97% to 98%, so that these cannot be solely used.

The contrast is now assumed to be certain light leakage, and calculation is performed by designating a reference point when the inclination is vertical. In FIG. 5, the value at the reference point (a first contrast according to the present invention) is a contrast of 400, for example.

When a multi-layer product is inclined about an absorption axis, as indicated by A2, the contrast is over the reference point value within the range from approximately 5° to 32–35° (a second contrast according to the present invention).

Therefore, a liquid crystal projector can be provided having characteristically better contrast compared with the case in which an absorption polarizing plate is used at approximately 45°, for example.

However, when the plate is vertically erected at 0°, the reflected light is returned to the liquid crystal panels 42 when displaying black color, and charge stored in liquid crystals leaks as a transistor is turned on, so that current is unfavorably produced. Therefore, it is preferable that inclination be an angle at which the reflected light is not returned to the liquid crystal panels 42.

According to the embodiment, it is preferable that an angle of inclination be from 15° to 30°, and the inclination be performed about the absorption axis of the DBEF and about the absorption axis of the polarizing plate. The liquid crystal panels 42 are formed to be horizontally oriented, so that the angle of inclination is required to be smaller when inclining vertically than when inclining laterally.

From the above, as for an upper limit angle (a second angle according to the present invention), it is preferable that the angle be larger than an angle at which a contrast is reduced and which is at least lower than a predetermined value in the contrast versus angle of inclination characteristics. Specifically, as shown in the characteristic graph of FIG. 5, it is preferable that the angle of inclination be approximately 33° to 35° at which the contrast on the curve A2 is below 400. In views where the starting angle descends on the curve A2 in FIG. 5 and the angle in FIG. 4 at which the polarization degree is high, etc., the angle of inclination may preferably be 30° or less, and more preferably, the angle of inclination may be approximately from 15° to 30°. In addition, as for the kind of polarizing plate to be used, as shown in A2 of FIG. 3, it is preferable that a multi-layer product, in which the transmissivity increases with increasing inclination in the angle, be inclined about the absorption axis.

(Lower Limit of Angle of Inclination)

Next, a lower limit value (a first angle according to the present invention) will be described with reference to FIGS. 6 and 7. In general, the lower limit value may preferably be an angle at which the light reflected by the reflection polarizing plate 60 does not return to the liquid crystal panel 42 (42G) via the prism 50.

For example, as shown in FIG. 7, when the reflection polarizing plate 60 (and the absorption polarizing plate 62) included in the polarization separator are arranged within a member 80 that is formed of the same material as that of the prism 50, the light reflected by the reflection polarizing plate 60 has an angle θ of inclination to pass through an apex O of the prism 50.

That is, when the prism 50 is not refractive to the reflected light, i.e., the angle of refraction is 0°, the incident angle and the reflection angle relative to the normal direction of the reflection polarizing plate 60 are identical to each other, so that the lower limit value is theoretically 22.5°.

However, the inventors of the present application have experimentally calculated a more preferable angle θ of inclination under the following conditions. When the size of the prism 50 is 40×40×40 mm; the size of the liquid crystal panels 42 is 1.3 inches and 28×21 mm (an aspect ratio of 4:3); and the minimum peripheral clearance is 5.0 mm, for example, the angle θ of inclination=16.1° becomes clear.

Therefore, in the structure shown in FIG. 7, it is preferable that an angle of inclination of the reflection polarizing plate 60 be at least not less than approximately 16.1°.

On the conditions mentioned above, however, when the minimum peripheral clearance is small, the angle θ of inclination is further reduced, and the angle θ of inclination may be approximately 15°.

In addition, in a normal example shown in FIG. 6 which does not have a glass member as shown in FIG. 7, since the reflected light is refracted at P point, for example, when it enters the prism 50, the angle of refraction may be added to the angle θ. For instance, an angle greater than the angle of refraction of ultraviolet light that is most refractive with a shortest wavelength may be added to the lower limit value of the angle of inclination as an increment. When the increment angle is denoted as α°, the lower limit values can be derived as cases of about 15°+α, 16.1°+α, 22.50+α, and so forth.

Therefore, as the lower limit values, when having the glass member, there may be a case of about 15° with the small minimum clearance, a case of 16.1° with the minimum clearance under the condition mentioned above, and a case of 22.5° theoretically calculated.

On the other hand, when no glass member is included in the structure, there may be a case of about 15°+α with the small minimum peripheral clearance, a case of 16.1°+α with the minimum clearance under the condition mentioned above, and a case of 22.5° theoretically calculated.

As described above, when the reflection polarizing plate 60 is arranged within the glass member 80 that is made of the same material (optical glass) as that of the prism 50, or the reflection polarizing plate 60 is sandwiched between two glass members, refraction does not occur when entering the prism 50 from ambience, in comparison with the case in which the reflection polarizing plate 60 is simply arranged with an angle of inclination as shown in FIG. 6, so that the lower limit value of the angle θ of inclination can be set to be small. The distance between the projection lens 70 and the prism 50 can thereby be further reduced, resulting in a brighter liquid crystal projector.

From the above, as angles of inclination of the reflection polarizing plate 60, when including the glass member 80, there is a case of 22.5° to about 30°, a case of 16.1° to about 30°, a case of about 15° to about 30°, a case of 22.5° to about 33°, a case of 16.1° to about 33°, a case of about 15° to about 33°, a case of 22.5° to about 35°, a case of 16.1° to about 35°, and a case of about 15° to about 35°, in order of preference.

When having no glass member 80, in order of preference, there are a case of 22.5°+α to about 30°, a case of 16.1°+α to about 30°, a case of about 15°+α to about 30°, a case of 22.5°+α to about 33°, a case of 16.1+α to about 33°, a case of about 15°+α to about 33°, a case of 22.5°+α to about 35°, a case of 16.1°+α to about 35°, and a case of about 15°+α to about 35°.

(Functions)

Next, functions of the liquid crystal projector formed as described above will be described with regard to at least one liquid crystal panel shown in FIG. 2.

In the liquid crystal projector 1 formed as described above, the P-wave, which has passed through the condenser lens 41, is reflected by the reflection polarizing plate 43, for example. Thereby, the absorption polarizing plate 44 is not required to absorb the polarized light, which is reflected as above, preventing the absorption polarizing plate 44 from being heated.

On the other hand, the S-wave, which has transmitted the condenser lens 41, passes through the reflection polarizing plate 43 and the absorption polarizing plate 44 so as to be modulated by the liquid crystal panel 42 in accordance with an image signal. The black region of the liquid crystal panel 42 has a birefringence effect of nematic liquid crystals during the S-wave passes through the liquid crystal panel 42, so that the polarizing surface is rotated at the right angle so as to emit the P-wave, which is formed by rotating the polarizing surface of the S-wave by 90° (orthogonal transformation), from the liquid crystal panel 42. On the other hand, in the white region of the liquid crystal panel 42, the polarizing surface of the S-wave proceeds straight so as to be emitted from the liquid crystal panel 42.

The S-wave emitted from the liquid crystal panel 42, in such a manner described above, passes through the prism 50, and then, after transmitting the reflection polarizing plate 60 and the absorption polarizing plate 62, it is projected on a screen by the projection lens 70.

On the other hand, the P-wave emitted from the liquid crystal panel 42 passes through the prism 50, and then is reflected outside the optical path by the reflection polarizing plate 60.

Therefore, one of polarized light rays is reflected outside of the optical path by the reflection polarizing plate 60, so that the light absorbed by the emitting side absorption polarizing plate 62 scarcely exists, preventing the emitting side absorption polarizing plate from being heated.

In the embodiment, the reflection polarizing plate 60 is arranged at an angle of inclination of at least about 15° to about 35° as described above.

By such a range of the angle of inclination, a liquid crystal projector can be provided with high contrast, as shown in the contrast versus angle of inclination characteristic chart of FIG. 5. Moreover, as shown in the polarization degree versus angle of inclination characteristic chart of FIG. 4, the high polarization degree can be maintained. In addition to this, the high transmissivity can be further maintained, as shown in the transmissivity the angle of inclination characteristic chart of FIG. 3.

Even when the value of the angle of inclination is close to the upper limit, because the occupied width of the reflection polarizing plate 60 is comparatively small, the distance between the liquid crystal panel 42 and the projection lens 70 can be reduced. For example, the inclination is required to perform in the vertical direction of the prism 50 at an angle within the range from about 15° to about 35°, so that the distance may be 0.5 paths at the most, where one path represents the distance between the liquid crystal panel 42 and the projection lens 70 as one unit. In general, the projected image of the liquid crystal projector 1 becomes dimmer with increasing distance between the liquid crystal panel 42 and the projection lens 70. On the other hand, with decreasing distance between the liquid crystal panel 42 and the projection lens 70, a brighter liquid crystal projector can be constructed. In the embodiment, since the distance can be reduced small, a liquid crystal projector with bright projected images can be achieved. In particular, since, in a three-disk liquid crystal projector 1 as shown in FIG. 1, a space between the prism 50 and the projection lens 70, which is defined in the related art, can be utilized for arrangement, an occupied space specialized for the reflection polarizing plate 60 is not now required, resulting in miniaturizing of the apparatus area when the polarizing plate is equipped.

Moreover, when the reflection polarizing plate 60 is inclined at an angle of about 15 which is close to the lower limit value, the reflected light (returning light) reflected by the reflection polarizing plate 60 transmits through the prism 50 once, and is emitted to the outside from the top surface (reflected-light-emitting surface) of the prism 50. Since, on the top surface (reflected-light-emitting surface), AR coat 52 is deposited, the reflected light (returning light) passing through the prism 50 is prevented from being reflected by the top surface so as to transmit to the outside, so that not only the reflected light by the reflection polarizing plate 60, but also the reflected light by the top surface (reflected-light-emitting surface) can be reduced, minimized or prevented from returning to the liquid crystal panel 42 as returning light, thereby reducing, minimizing or preventing error operation of the liquid crystal panel 42.

In addition, as described above, when the reflection polarizing plate 60 (and the absorption polarizing plate 62) are arranged within the glass member 80, which is made of a material that is substantially the same as that of the prism 50 as shown in FIG. 7, the lower limit value is about 15°; when the glass member 80 is not formed as shown in FIG. 6, since the reflected light is refracted on an incident surface in which the reflected light enters, the angle α needs to be added thereto as an increment for refraction. It is sufficient that this angle α be larger than the angle of refraction of ultraviolet light that is most refractive with a shortest wavelength, for example.

In the related art, an absorption polarizing plate disposed in an emitting side is heated to burn when displaying black color; however, according to the embodiment described above, as the light to be absorbed into the absorption polarizing plate is reflected using the reflection polarizing plate on the emitting side, the burning can be prevented. Thereby, cooling is facilitated while the capacity of a cooling fan is reduced, resulting in miniaturization of the apparatus and reduction in noises. Furthermore, a long life of the apparatus is enabled by reducing the thermal burden of the absorption polarizing plate on the emitting side.

Furthermore, as the preferred range of the angle of inclination of the polarizing plate can be set to be comparatively narrow as mentioned above, the distance between the projection lens and the liquid crystal panel can also be reduced, thereby achieving a bright liquid crystal projector. Moreover, due to the angle mentioned above and AR coat, the returning light reflected on the polarizing plate and the prism can be reduced, minimized or prevented from entering the liquid crystal panel.

Furthermore, in addition to high contrast performance of the multi-layer product itself due to the angle mentioned above, as polarizing plates are used in the incident side and emitting side of the liquid crystal panel, the contrast can be enhanced in comparison with the case in which a polarizing plate is not used.

[Second Embodiment]

Next, a second embodiment according to the present invention will be described with reference to FIG. 8. In addition, a description of substantially the same structures as those of the first embodiment is omitted below; such that only different parts will be described. FIG. 8 is a schematic of a liquid crystal projector according to the second embodiment.

According to the first embodiment, the vertical occupied length of the reflection polarizing plate is identical with the vertical length of the prism. However, a reflection polarizing plate of a liquid crystal projector according to the embodiment has a smaller occupied length than the vertical length of the prism.

As shown in FIG. 8, in addition to structures that are common to the first embodiment, a liquid crystal projector 100 according to the embodiment includes a reflection polarizing plate 110 included in a polarization separator inclined at an angle θ2 of inclination and having an occupied height Z2 smaller than the width (height) Z1 of the prism 50 and an absorption polarizing plate 112 having the same transmission axis as that of the reflection polarizing plate 110.

In side-end regions ZP and ZP of the prism 50, optical ununiformity due to manufacturing is comparatively liable to be produced. Therefore, according to the embodiment, the optical uniformity can be maintained by avoiding using the side-end regions ZP and ZP.

That is, an arrangement region of the reflection polarizing plate 110 and the absorption polarizing plate 112 is formed by the occupied height Z2 excluding the side-end regions ZP and ZP of the prism 50, as shown in FIG. 8.

In this case, as for the angle θ2 of inclination, the upper limit value is not modified identically with the first embodiment. However, the lower limit value needs to be slightly modified.

That is, by a decrement that the occupied height is reduced to be Z2, a correction angle δ needs to be subtracted from the lower limit value of the first embodiment. Accordingly, the lower limit value (a fourth angle according to the present invention) of the angle of inclination according to the embodiment is about 15°−δ when the clearance is small, and 16.1°−δ when the clearance is normal. However, this is a condition when the reflection polarizing plate 110 (and the absorption polarizing plate 112) are arranged within a glass member 120 which is made of a material substantially the same as that of the prism 50 as shown in FIG. 9, and refraction does not occur on the boundary between the prism 50 and the atmosphere. When the reflection polarizing plate 110 (and the absorption polarizing plate 112) are arranged in the atmosphere, the angle α needs to be added thereto as an increment for refraction just like in the first embodiment. On such a condition, as the lower limit value, there is a case of about 15°+α−δ, a case of 16.1°+α−δ, and so forth.

From the above, as angles of inclination of the reflection polarizing plate 110, when including the glass member 120, there is a case of 16.1°−δ to about 30°, a case of about 15°−δ to about 30°, a case of 16.1°−δ to about 33°, a case of about 15°−δ to about 33°, a case of 16.1°−δ to about 35°, and a case of about 15°−δ to about 35°, in order of preference.

When no glass member 120 is included, in order of preference, there is a case of 16.1°+α−δ to about 30°, a case of about 15°+α−δ to about 30°, a case of 16.1°+α−δ to about 33°, a case of about 15°+α−δ to about 33°, a case of 16.1°+α−δ to about 35°, and a case of about 15°+α−δ to about 35°.

As described above, according to the embodiment, while having the same advantages as those of the first embodiment, by avoiding using the side-end regions of the prism, in which optical ununiformity due to prism manufacturing is comparatively liable to be produced, a liquid crystal projector capable of maintaining the optical uniformity can be provided.

Reduction in the occupied height of the polarizing plate further reduces the angle of inclination in comparison with that of the first embodiment, while reduction in the occupied width enables a liquid crystal projector with more enhanced brightness to be provided.

[Third Embodiment]

Next, a third embodiment according to the present invention will be described with reference to FIG. 10. FIG. 10 is a schematic of a part of a liquid crystal projector according to the third embodiment.

As shown in FIG. 10, in addition to structures common to the first embodiment, a liquid crystal projector 130 according to the embodiment includes a reflection polarizing plate 140 having two incident surfaces (reflection surfaces) 140a and 140b respectively inclined at an angle θ3 relative to the optical axis and arranged to be substantially V-shaped in cross-section, instead of a one-disk-shaped reflection polarizing plate as in the first embodiment, and a disk-shaped absorption polarizing plate 142. In addition, the absorption polarizing plate 142 may be V-shaped in the same way.

In this case, the lower limit value of the angle of inclination (a third angle according to the present invention) is examined by the inventors of the present application on the same condition as the first embodiment, resulting in the angle θ3 of inclination=9.35°.

Accordingly, the lower limit value of the angle of inclination in this case is to be approximately 9.35° including measuring and fitting errors.

However, this is a condition that occurs when the reflection polarizing plate 140 is arranged within a glass member 150, which is made of a material that is substantially the same as that of the prism 50 as shown in FIG. 12, and refraction is not performed on the boundary between the prism 50 and the atmosphere. When the reflection polarizing plate 140 is arranged in the atmosphere as shown in FIG. 11, the angle α needs to be added thereto as an increment for refraction just like in the first embodiment. On such a condition, the lower limit value is to be 9.35°+α. In addition, the upper limit value is not changed just like in the first embodiment.

From the above, as angles of inclination of the reflection polarizing plate 150, when including the glass member, there is a case of 9.35° to about 30°, a case of about 9.35° to about 33°, and a case of 9.35° to about 35°, in order of preference.

When no glass member is included, in order of preference, there is a case of 9.35°+α to about 30°, a case of about 9.35°+α to about 33°, and a case of 9.35°+α to about 35°.

As described above, according to the embodiment, while having the same advantages as those of the first embodiment, the distance between the projection lens and the liquid crystal panel can be further reduced compared with the first and second embodiment, so that a liquid crystal projector with more enhanced brightness and a smaller size can be provided.

In addition, in such a V-shaped polarizing plate, it may be a short polarizing plate which does not extend inside the side-end regions of the prism just like in the second embodiment. Moreover, upper and lower incident surfaces of the V-shape may have different angles of inclination from each other.

[Fourth Embodiment]

Next, a fourth embodiment according to the present invention will be described with reference to FIG. 13. FIG. 13 is a schematic of a part of a liquid crystal projector according to the fourth embodiment.

As shown in FIG. 13, in addition to structures common to the first embodiment, a liquid crystal projector 160 according to the embodiment includes a reflection polarizing plate 170, an absorption polarizing plate 171, both the plates 170 and 171 are curved and have lengths slightly longer than that of one side of the prism 50, and a light absorber 172 which is a heat absorbing member that absorbs heat by condensing the reflected light from the curved portion.

As a material of the light absorber 172, it is preferable to use bismuth sulfide, for example. Thereby, heat can be efficiently absorbed. However, the light absorber 172 can be made of other materials.

When curving the plates in such a manner, the occupied width is reduced to be smaller than that in an oblique arrangement, so that in a narrow space between the prism 50 and the projection lens 70, curving enables the reflected light to be dispersed, although the angle of inclination according to the first embodiment is not achieved. Therefore, while having the same advantages as those of the first embodiment, the distance between the projection lens and the liquid crystal panel can be further reduced, so that a liquid crystal projector with more enhanced brightness and a smaller size can be provided.

Moreover, by using bismuth sulfide as the light absorber, the heat can be efficiently absorbed.

In the embodiment, both of the reflection polarizing plate 170 and the absorption polarizing plate 171 are curved. However, only the reflection polarizing plate 170 may be curved.

[Fifth Embodiment]

Next, a fifth embodiment according to the present invention will be described with reference to FIG. 14. FIG. 14 is a schematic of a part of a liquid crystal projector according to the fifth embodiment.

As shown in FIG. 14, in addition to structures that are common to the first embodiment, a liquid crystal projector 180 according to the embodiment includes a V-shaped reflection polarizing plate 190 having two incident surfaces (reflection surfaces) 190a and 190b which are curved portions that are respectively curved relative to the optical axis, instead of a one-disk-shaped reflection polarizing plate as in the first embodiment, a disk-shaped absorption polarizing plate 191, and light absorbers 192a and 192b which are a pair of heat absorbing members respectively disposed outside of the prism 50 in the vertical direction that absorb heat by condensing the reflected light from the incident surfaces (reflection surfaces) 190a and 190b. In addition, the absorption polarizing plate 191 may be V-shaped in the same way.

According to the embodiment, while having the same advantages as those of the first embodiment, the distance between the projection lens and the liquid crystal panel can be further reduced compared with the first and second embodiment, so that a liquid crystal projector with more enhanced brightness and a smaller size can be provided.

In addition, in such a V-shaped polarizing plate, it may be a short polarizing plate which does not extend inside the side-end regions of the prism just like in the second embodiment.

An apparatus and operation according to the present invention have been described in connection with several specific embodiments. However, those skilled in the art will appreciate that various modifications of the embodiments that fall within the spirit and scope of the present invention may be used. For example, a three-disk liquid crystal projector is described in the above embodiments. However, a one-disk liquid crystal projector may be also applied to the above embodiments. In this case, the direction of inclination and curvature is not only vertical (inclination about the X-axis on an X-Z plane), but it may also be lateral (inclination about the Z-axis on the X-Z plane). In addition, the liquid crystal panels are formed to be horizontally oriented, so that the inclination about the X-axis is more preferable. Also, in the example shown in FIG. 10, not only the two reflection surfaces in the vertical direction, but also four reflection surfaces respectively inclined in the vertical and lateral directions, may be formed. Furthermore, these four surfaces may be curved as shown in FIG. 14, respectively.

Moreover, in examples shown in FIGS. 13 and 14, the curved portion may be a multi-step curvature as long as light does not return.

In the embodiments described above, the prism and the glass member are formed as different members. However, the polarization separator may be formed on the side of the prism integrally formed with the glass member.

Combinations between the embodiments and between each embodiment and each modification may be applied to the present invention, of course.

[Advantages]

As described above, according to the present invention, as the light to be absorbed into an absorption polarizing plate is reflected using a polarization separator on the emitting side, heating and burning in the polarizing plate can be reduced, minimized or prevented. Thereby, cooling is facilitated while the capacity of a cooling fan is reduced, resulting in miniaturization of the apparatus and reduction in noises. Furthermore, a long life is enabled by reducing the thermal burden of the absorption polarizing plate on the emitting side.

Furthermore, as the preferred range of an angle of inclination of the polarizing plate can be set to be comparatively narrow, the distance between a projection unit and a liquid crystal panel can also be reduced, thereby achieving a bright liquid crystal projector. Moreover, due to the angle mentioned above and a transmissive member, the returning light reflected on the polarization separator and a color-combining unit can be reduced, minimized or prevented from entering the liquid crystal panel.

By the high contrast performance of the polarization separator itself due to the angle mentioned above, the contrast can be enhanced.

What is claimed is:

1. A projection display apparatus for use with an object to be projected, comprising:

a light source that projects light onto the object to be projected;

a polarizing unit that polarizes the light emitted from the light source;

a color-separation unit that divides the light polarized by the polarizing unit into a plurality of colors;

a plurality of liquid crystal panels that respectively modulate the plurality of colors divided by the color-separation unit;

a color-combining unit that combines the plurality of colors respectively modulated by the plurality of liquid crystal panels so as to generate composite light including the plurality of colors, whereby the composite light comprises at least one of first light rays and second light rays;

a polarization separator that separates the first light rays, which are included in the composite light generated by the color-combining unit and modulated by the liquid crystal panels, from the second light rays, which are modulated by the liquid crystal panels, by allowing the first light rays to pass therethrough while reflecting the second light rays therefrom; and a projecting unit that projects the first light rays separated by the polarization separator onto the object to be projected, the polarization separator being formed by a first reflection polarizing member disposed so as to face the color-combining unit and a second absorption polarization member disposed so as to face the projecting unit.

2. The apparatus according to claim 1, the polarization separator being arranged so that an angle of inclination of the polarization separator, which is defined between a surface that is perpendicular to the direction of travel of the composite light generated by the color-combining unit and a polarization-separator surface on which the composite light enters, results in a contrast that is larger than a contrast at which the angle of inclination is 0°, which is specified by characteristics defining a relationship between the angle of inclination of the polarization separator and the contrast which is a degree of separation to separate the first light rays from the second light rays.

3. The apparatus according to claim 2, the angle of inclination of the polarization separator ranging substantially from 15° to 35°.

4. The apparatus according to claim 1, the polarization separator being provided with a plurality of incident surfaces, on which the composite light enters, arranged to be substantially V-shaped in cross-section.

5. The apparatus according to claim 4, the polarization separator being arranged at an angle of inclination within a range from a third angle at which the second light rays reflected by the incident surfaces do not enter the liquid crystal panels to a second angle corresponding to a second contrast which is larger than a first contrast in that a composite-light-emitting surface of the color-combining unit is substantially in parallel with each incident surface in the contrast versus angle of inclination characteristics of the polarization separator.

6. The apparatus according to claim 4, each of the incident surfaces of the polarization separator being provided with a curved portion so that the second light rays reflected by the each of the incident surfaces do not enter the liquid crystal panels and is further provided with each heat-absorption member for absorbing the heat generated due to the second light rays reflected by the individual curved portions.

7. The apparatus according to claim 1, the liquid crystal panels being formed to be horizontally oriented, and the polarization separator being inclined in a direction separated from a composite-light-emitting surface of the color-combining unit when proceeding in a direction corresponding to a shorter side of the liquid crystal panels.

8. The apparatus according to claim 1, further comprising a transmissive member that guides the second light rays reflected by the polarization separator through the color-combining unit to an exterior of the color-combining unit, the transmissive member being placed on an emitting surface from which the second light rays are emitted from inside the color-combining unit to the exterior.

9. The apparatus according to claim 1, further comprising a glass member disposed adjacent to the composite-light-emitting surface of the color-combining unit and formed of material that is the same as material of the color-combining unit, the polarization separator being incorporated into the glass member.

10. The apparatus according to claim 1, the first reflection polarization member and the second absorption polarization member being formed so as to be integrally laid.

11. The apparatus according to claim 1, the color-combining unit at least including an emitting surface, from which the second light rays can be emitted from within the color-combining unit to the exterior, and a surface facing the emitting surface, the polarization separator having a length of the color-combining unit except side-end regions at least in a direction that the surfaces oppose each other.

12. The apparatus according to claim 11, the polarization separator being inclined by designating a reference point further inside the side-end regions, and being arranged at an angle of inclination within a range from a fourth angle at which the second light rays reflected by the polarization separator does not enter the liquid crystal panels to the second angle corresponding to the second contrast which is larger than the first contrast in that the composite-light-emitting surface of the color-combining unit is substantially in parallel with an incident surface of the polarization separator in the contrast versus angle of inclination characteristics of the polarization separator.

13. The apparatus according to claim 1, the polarization separator being provided with a curved portion so that the second light rays reflected by the polarization separator cannot enter the liquid crystal panels, and being further provided with a heat-absorption member that absorbs heat generated due to the second light rays being reflected by the curved portion.

14. The apparatus according to claim 13, further comprising a transmissive member that guides the second light rays reflected by the polarization separator through the color-combining unit to the exterior of the color-combining unit, the transmissive member being placed on an emitting surface from which the second light rays are emitted from inside the color-combining unit to the exterior.

15. The apparatus according to claim 13, further comprising a glass member disposed adjacent to a composite-light-emitting surface of the color-combining unit and formed of material that is the same as material of the color-combining unit, the polarization separator being incorporated into the glass member.

16. The apparatus according to claim 13, the first reflection polarization member and the second absorption polarizing member being formed so as to be integrally laid.

17. The apparatus according to claim 1, an incident surface of the polarization separator being inclined relative to an optical axis, and the polarization separator being arranged at an angle of inclination within a range from a first angle at which the second light rays reflected by the polarization separator do not enter the liquid crystal panels to a second angle corresponding to a second contrast which is larger than a first contrast in that an emitting surface of the liquid crystal panels is substantially in parallel with the incident surface of the polarization separator in the contrast versus angle of inclination characteristics of the polarization separator.

18. The apparatus according to claim 17, the polarization separator being inclined about one of two axes perpendicularly intersecting the optical axis.

19. The apparatus according to claim 18, the polarization separator being inclined about both of the two axes.

20. The apparatus according to claim 17, the polarization separator being provided with a plurality of incident surfaces, on which the composite light enters, arranged to be substantially V-shaped in cross-section.

21. The apparatus according to claim 20, each of the incident surfaces of the polarization separator being provided with a curved portion so that the second light rays reflected on the each of the incident surfaces cannot enter the liquid crystal panels, and being further provided with a heat-absorption member that absorbs the heat generated due to the second light rays reflected by the individual curved portions.

22. The apparatus according to claim 17, the polarization separator being formed by integrally laying the first reflection polarization member disposed on the side of the liquid crystal panels on the second absorption polarizing member disposed so as to face the projecting unit.

* * * * *